United States Patent [19]

Landler et al.

[11] 4,182,708
[45] Jan. 8, 1980

[54] PROCESS FOR THE PREPARATION OF AZO PIGMENTS BY DIAZOTIZING IN A DIPOLAR APROTIC ORGANIC SOLVENT AND AZO PIGMENTS OBTAINED THEREFROM

[75] Inventors: Josef Landler, Hofheim; Klaus Hunger, Kelkheim; Erhard Wörfel, Hattersheim, all of Fed. Rep. of Germany

[73] Assignee: Hoechst Aktiengesellschaft, Frankfurt am Main, Fed. Rep. of Germany

[21] Appl. No.: 761,071

[22] Filed: Jan. 21, 1977

Related U.S. Application Data

[63] Continuation-in-part of Ser. No. 619,460, Oct. 3, 1975, abandoned, which is a continuation of Ser. No. 325,549, Jan. 22, 1973, abandoned.

[30] Foreign Application Priority Data

Jan. 21, 1972 [DE] Fed. Rep. of Germany ....... 2202773

[51] Int. Cl.$^2$ .................... C09B 29/20; C09B 29/32; C09B 29/36; C09B 29/38
[52] U.S. Cl. ................................. 260/208; 106/288 Q; 260/144; 260/155; 260/157; 260/162; 260/163; 260/176; 260/193; 260/203; 260/204

[58] Field of Search ............ 260/144 P, 208, 174–193, 260/157, 162, 163, 155, 203, 204; 106/308, 288 Q

[56] References Cited

U.S. PATENT DOCUMENTS

| | | | |
|---|---|---|---|
| 2,683,708 | 2/1954 | Dickey et al. | 260/158 |
| 2,790,791 | 4/1957 | Towne et al. | 260/158 |
| 3,213,080 | 10/1965 | Bloom et al. | 260/155 |
| 3,382,228 | 5/1968 | Ferrari et al. | 260/158 |
| 3,642,769 | 2/1972 | Moritz et al. | 260/207 |
| 3,711,461 | 1/1973 | Pretzer et al. | 260/154 |
| 3,781,266 | 12/1973 | Dietz et al. | 260/157 |
| 3,793,305 | 2/1974 | Balon | 260/154 |

*Primary Examiner*—Floyd D. Higel
*Attorney, Agent, or Firm*—Curtis, Morris & Safford

[57] ABSTRACT

Azo pigments are obtained by diazotizing a diazotizable aromatic amine without solubilizing groups in anhydrous dipolar aprotic water-miscible solvents with the stoichiometric amount or a small excess of nitrosylsulfuric acid or nitrosyl chloride, coupling the diazonium compound so obtained with a coupling component and isolating the pigment obtained in usual manner. This process is carried out in homogeneous solution and yields azo pigments the advantageous properties of which cannot be achieved by other methods, for example, the excellent purity, grain softness, narrow range of particle size distribution, excellent dispersibility in plastic materials and color lacquers, high gloss and excellent opacity in color lacquers.

7 Claims, No Drawings

PROCESS FOR THE PREPARATION OF AZO PIGMENTS BY DIAZOTIZING IN A DIPOLAR APROTIC ORGANIC SOLVENT AND AZO PIGMENTS OBTAINED THEREFROM

This is a continuation-in-part of our copending Application Ser. No. 619,460 filed Oct. 3, 1975, now abandoned which in turn is a continuation of our prior Application Ser. No. 325,549 filed Jan. 22, 1973, now abandoned. The present invention relates to a process for the preparation of azo pigments and to the pigments so obtained.

The term "pigment" is defined in ASTM D16–73a as follows: "the fine solid particles used in the preparation of paint or printing ink and substantially insoluble in the vehicle. Asphaltic materials are not pigments except when they contain substances substantially insoluble in the vehicle which they are used." In contrast thereto, a "dyestuff" is a coloring matter which is soluble in its application medium, e.g. a disperse dyestuff in polyester (cf. German Industrial Standards DIN 55 944 and 55 945).

Organic solvents can be classed according to their specific interaction with the dissolved material into hydrogen-donors which are protic solvents, and solvents not capable of donating labile hydrogen atoms which are aprotic solvents. The latter class can be further distinguished as to their polarity, using the dielectric constant and the dipole moment as criteria. Aprotic solvents having a dielectric constant below 15 and a dipole moment below 2D are "apolar", solvents with a dielectric constant above 15 and a dipole moment above 2.5 D are "dipolar". (A. J. Parker, Quarterly Reviews, Vol, XVI, 1962, p. 163 et seq.; Christian Reichardt, Lösungsmittel-Effekte in der organischen Chemie, Verlag Chemie, Weinheim, 1969, p. 34–36).

It is known that azo dyestuffs are prepared by coupling in organic solvents for which purpose stabilized diazonium compounds or triazinones must be used since coupling in solvents not miscible with water must be carried out at elevated temperatures which the usual diazonium compounds do not resist. In all cases, intermediate isolation of the diazonium compounds is thus required. Since diazotizations are carried out, for economical reasons, preferably with inorganic nitrites as diazotizing reactants and these salts are not soluble in organic solvents, diazotization with inorganic nitrites in anhydrous organic solvents is not possible.

It is also known that diazotizations are carried out without isolating the diazo compounds and coupling in organic solvents having up to 10% of water in heterogeneous phase. To this effect, aqueous sodium nitrite or esters of nitrous acid are preferably used for the diazotization together with an inorganic or organic acid.

According to another known process, diazotization is also carried out by reacting an anhydrous mixture of diazotizable amine, a coupling component and an organic acid in an organic solvent not miscible with water having a dielectric constant <15 with an ester of the nitrous acid.

According to the last-mentioned processes, diazotization and coupling occur practically simultaneously.

The present invention provides a process for the preparation of azo pigments by diazotization in anhydrous solvents, which process comprises diazotizing a diazotizable aromatic amine without water-solubilizing groups in anhydrous dipolar aprotic organic water miscible solvents with nitrosyl sulfuric acid or nitrosylchloride, coupling the diazonium compound so obtained with a coupling component, neutralizing the acid, aftertreating the pigment so obtained without intermediate isolation and then isolating it in usual manner.

Suitable dipolar aprotic organic solvents miscible with water are, for example, dimethyl formamide, dimethyl acetamide, N-methylpyrrolidone, dimethyl sulfoxide, tetramethylene sulphone, tetramethyl urea or hexamethyl phosphoric acid triamide.

The diazotization is effected by adding the stoichiometrical amount of nitrosyl sulfuric acid at a temperature of about −20° C. to 0° C. In some cases it is advantageous to work at temperatures to about 40° C. Instead of nitrosyl sulfuric acid nitrosyl chloride may also be used. A small excess of these diazotizing reactants is not detrimental. Since nitrosyl sulfuric acid can be mixed with all organic dipolar aprotic solvents diazotization can be carried out either by introducing the acid into the solvent or solvent mixture and adding the amine in solid form or also dissolved in the solvent, or vice versa, the amine dissolved in the solvent or solvent mixture being first introduced and then pure or dissolved nitrosyl sulfuric acid being added.

Suitable diazotizable aromatic amines are, in addition to the amines generally known in the chemistry of the azo pigments, with particular advantage those which contain non-solubilizing groups, for example, carbamoyl groups, carboxylic acid anilide groups, acylamino or arylamino groups and which can be diazotized in aqueous acid only with difficulty.

According to this invention amines containing these groups can easily be diazotized in solution and in the cold.

The coupling is then effected by adding the coupling component in the solid state or while dissolved in the same solvent to the diazonium compound, or by proceeding in the opposite sense, at temperatures from −10° to 50° C., preferably at room temperature. The diazonium compound and the coupling component are generally used in a molar ratio of 1:1, but one of the two components may also be used in excess up to 20 mol %. To complete the coupling, it is advantageous to neutralize the acid by adding equivalent amounts of a base, preferably of a tertiary organic base, for example, pyridine, dimethyl aniline or triethanol amine.

Suitable coupling components are all systems capable of coupling, for example, compounds selected from the series of the 2-hydroxy-3-naphthoylaminoarylides, acetoacetlyaminoaryles, pyrazolones, hydroxy-quinolines, 2-hydroxy-3-naphthoylaminobenzimidazolones and acetoacetylaminobenzimidazolones. The process of the invention especially applies to coupling components, which are difficult to dissolve in an aqueous medium. The reactions are preferably carried out in the anhydrous medium but the formation of certain crystal structures can be promoted by the addition of up to 50% of water before, during or after coupling. Coupling is followed without intermediate isolation by a conditioning of the azo pigments obtained. This thermal after-treatment is preferably carried out in the same solvent or solvent mixture and vessel wherein the synthesis was carried out, the maximum conditioning temperatures being determined by the boiling points of the aprotic solvents if the reaction is not effected under pressure. The azo pigments are isolated by filtration and then dried. But it is also possible to add to the finished or unfinished azo pigment suspended in the organic solvent, adjuvants which are soluble in the dipolar aprotic solvent, for example resins or polymers or organic amines having a long chain in order to obtain in this manner an additional special preparation of the azo pigments according to a homogeneous process. In this case, the solvent will be distilled afterwards.

The advantage of the process of the invention lies in the fact that the diazotization and the coupling are carried out in homogeneous solution so that all adjuvants heretofore used in known processes are superfluous, for example, emulsifiers, dispersing agents, buffer mixtures and alkalis for the solution and acids for the precipitation of the coupling components. Furthermore, starting materials of a low degree of purity which cannot be used in the known processes in an aqueous medium can be used in the process of the present invention since the impurities remain dissolved in the dipolar aprotic solvent. Further advantages are the use of easily accessible nitrosyl sulfuric acid, the quantitative course of the reaction and the possibility to apply this process to starting compounds which are sparingly soluble in other solvent systems but which are soluble in the dipolar aprotic solvents used herein. Due to the homogeneous reaction in solution the quality of the azo pigments obtained are more reproducible than when prepared under known coupling conditions in the heterogeneous phase. As no further salts precipitate besides the small amount of organic base sulphate which are soluble in the dipolar organic aprotic solvent used they can easily be removed when isolating the azo pigments. The solvent used can be recovered by distillation so that no sewage water is formed.

The fact that diazotization and coupling are effected in the same vessel but successively, furthermore leads to a homogeneous reaction supplying the pigment desired whereas processes in which the diazotization and coupling occur simultaneously lead to a great number of side reactions, reducing the quality of the pigment. The new process can easily be carried out in industry as the thermal after treatment of the pigments may also be carried out in the same vessel in which the diazotization and coupling have been effected.

The process of the invention yields azo pigments which have advantageous properties not achieved by other methods, for example, excellent purity, grain softness, narrow range of particle size distribution, excellent dispersibility in plastic materials and color lacquers, high-gloss and excellent capacity in color lacquers. The following Examples illustrate the invention.

EXAMPLE 1

10 ml of nitrosyl sulfuric acid were added dropwise to 50 ml of N-methylpyrrolidone cooled to −5° to −10° C. Into this solution 11.5 g of 2-methyl-4-amino-5-methoxy-benzenesulfonic acid methyl amide dissolved in 50 ml of N-methyl-pyrrolidone were introduced dropwise at −5° C. The mixture was stirred at −5° C. for 30 minutes whereafter a solution of 17.55 g of 5-(2'-hydroxy-3'-naphthoylamino)-benzimidazolone sodium salt in 300 ml of N-methylpryrrolidone was introduced. After stirring for another 10 minutes 20 ml of pyridine were added. The pigment precipitated from the deep red solution. Stirring was continued over night, the whole was heated to 140° C. which temperature was maintained for 10 minutes. After cooling to 70–80° C. the pigment was suction filtered, washed with 100 ml of N-methylpyrrolidone and then with hot water and dried at 70° C. The yield was 26 g (=93% of the theoretical amount) of a crimson red pigment having excellent capacity and high gloss in alkyd resin-melamine resin stove lacquers and having very good fastness properties.

EXAMPLE 2

A solution of 17.55 g of 5-(2'-hydroxy-3'-naphthoylamino)-benzimidazolone sodium salt in 300 ml of N-methylpyrrolidone and 150 ml of water were fed at 5° to 10° C. into the diazonium salt solution of 2-methyl-4-amino-5-methoxybenzene sulfonic acid methylamide as prepared according to Example 1. The mixture was stirred at room temperature for 15 hours, then heated to 115° C. and, after having been maintained at that temperature for 15 minutes it was cooled to about 80° C., suctionfiltered, washed with 100 ml of N-methylpyrrolidone and then with hot water and dried. The yield obtained was 26.6 g (=95% of the theoretical amount) of a bluish-red pigment having excellent technical properties; its crystal modification was different from that of the pigment prepared according to Example 1 having the same chemical constitution.

EXAMPLE 3

10 ml of nitrosyl sulfuric acid were added dropwise at 0° C. to 50 ml of dimethyl sulfoxide. The mixture was stirred for 30 minutes at that temperature and a solution of 11.5 g of 2-methyl-4-amino-5-methoxybenzenesulfonic acid methyl amide was added in 50 ml of dimethyl sulfoxide. This solution was stirred for 2 hours, the temperature being allowed to rise to 5° C. A solution of 17.55 g of 5-(2'-hydroxy-3'-naphthoylamino)-benzimidazolone sodium salt, 250 ml of dimethyl sulfoxide and 50 ml of water were introduced dropwise into the diazo suspension described above, the temperature being raised to 10° C. After stirring for another 30 minutes, 20 ml of pyridine were added and stirring was continued over night at room temperature. The mixture was heated to 130° C. and maintained at that temperature for 20 minutes. After cooling to 80° C. it was suction-filtered, washed with hot water and dried at 70° C. The yield obtained was 26.6 g (=95% of the theoretical amount) of a crimson red pigment having the same constitution and crystal modification as the pigment described in Example 1.

EXAMPLE 4

By proceeding in the manner as described in Example 3, but using instead of dimethyl sulfoxide hexamethylphosphoric acid trisamide and maintaining the pigment obtained at 105° C. for 20 minutes, 23.5 g (=87% of the theoretical amount) of the pigment described in Example 1 were obtained after the usual after-treatment.

The following Examples were carried out in the same manner as described in Example 3, while the solvent and the after-treatment have been modified as disclosed in Table 1:

| Example | Solvent | After-treatment | Yield (= % of the theoretical amount) |
|---|---|---|---|
| 5 | tetramethylene sulfone | 1 hour at 110° C. | 22.8 g = 84% |
| 6 | N,N-dimethylacetamide | ½ hour at 110° C. | 26.0 g = 93% |
| 7 | tetramethyl urea | ½ hour at 115° C. | 21.9 g = 78% |

EXAMPLE 8

20 ml of nitrosylsulfuric acid were added dropwise to 300 ml of dimethyl formamide cooled to −5° to −10° C. After stirring for 10 minutes, 28.5 g of crystalline 3-amino-4-methoxybenzoylamino-4′-benzamide were strewn into that solution. Stirring was continued for 1 hour at −5° C. 37 g of 2-hydroxy-3-naphthoyl-2′,5′-dimethoxy-4′-chloranilide were dissolved in 400 ml of dimethyl formamide and cooled to 0° C. The diazonium salt solution was added at that temperature, 40 ml of pyridine were added too and the mixture was stirred for 2 hours. The pigment suspension was heated to 140° C. and maintained at that temperature for 3½ hours. After cooling to 70° C. it was suction-filtered, washed twice with 50 ml of dimethyl formamide and then with hot water. The yield obtained was 59.6 g (=91.1% of theoretical amount) of a very pure bluish red pigment having an excellent processability in the lacquer and excellent fastness properties.

EXAMPLE 9

18 ml of nitrosyl sulfuric acid were added dropwise to 100 ml of dimethyl formamide cooled to −10° C. and the mixture was stirred for 15 minutes.

28.5 g of 3-amino-4-methoxybenzoylamino-4′-benzamide were dissolved in 500 ml of dimethylformamide while heating slightly, filtered and added dropwise, after cooling to 25° C., to the nitrosyl sulfuric acid solution, the temperature being maintained at −5° C. to 0° C. After stirring had been continued for 1 hour 39.5 g of 2-hydroxy-3-naphthoyl-2′,5′-dimethoxy-4′-chloranilide were strewn into the diazonium salt solution obtained. 40 ml of pyridine were added and stirring was continued over night at room temperature. The mixture was heated to 140° C. and maintained at that temperature for 3½ hours. After cooling to 70° C. the mixture was filtered and the filter residue washed three times with each 100 ml of dimethyl formamide and then it was evaporated to dryness in a water jet vacuum with a bath temperature of 70° C. using a rotating evaporator. The yield obtained was 58.7 g (=89.7% of the theoretical amount) of a red pigment having excellent working and fastness properties.

EXAMPLE 10

100 ml of N-methylpyrrolidone were cooled to −5° to −10° C. Within 15 hours 20 ml of nitrosylsulfuric acid were added dropwise, and the solution was stirred for 15 minutes. 17.05 g of 4-chloro-3-aminobenzamide were dissolved in 100 ml of N-methylpyrrolidone and were added dropwise to the nitrosylsulfuric acid solution within 20 minutes. This solution was stirred for 1 hour at 0° to −5° C. 34.3 g of 2-hydroxy-3-naphthoylamino-4′-acetylaminobenzene were dissolved in 500 ml of N-methylpyrrolidone and cooled to −5° C. Within 30 minutes the diazo solution described was added dropwise to that solution. 40 ml of pyridine were added and stirred at room temperature for 2 hours. Then, the mixture was heated to 130° C. and maintained at that temperature for 1 hour. After cooling to 70° C. it was suction-filtered, washed with hot water and dried. The yield obtained was 37.5 g (=75% of the theoretical amount) of a yellowish red pigment which supplied, in a lacquer a bright, easily dispersible, covering dyeing having very good fastness properties.

In the same manner as described above the following pigments were prepared from the components mentioned in the Table hereunder:

| Example | Diazo component | Coupling Component | Solvent | Yield | Shade |
|---|---|---|---|---|---|
| 11 | 4-chloro-3-aminobenzamide | 2-hydroxy-3-naphthoyl-amino-4′-acetylaminobenzene | DMF | 79.5% | yellowish red |
| 12 | 4-chloro-3-aminobenzamide | 2-hydroxy-3-naphthoyl-amino-4′-acetylaminobenzene | NMP | 85% | yellowish red |
| 13 | 5-chloro-4-amino-2-acet-amino-toluene | 2-hydroxy-3-naphthoyl-amino-7′-chloro-5-′-benzimidazolone | DMF | 91% | bluish-red |
| 14 | 2-amino-terephthalic acid-methyl ester-5-(2′,5′-dichloro)-anilide | 2-hydroxy-3-naphthoylamino-2′-methoxybenzene | NMP | 81% | yellowish red |
| 15 | anthranilic acid-n-butyl ester | 2-hydroxy-3-naphthoylamino-5′-benzimidazolone | DMF | 87% | bluish red |
| 16 | anthranilic acid methyl ester | 2-hydroxy-3-naphthoylamio-5-benzimidazolone | DMF | 91% | red brown |
| 17 | 3-amino-4-chlorobenzamide | acetoacetylaminobenzimidazolone | NMP/10% of water | 79% | greenish yellow |
| 18 | 4-amino-3,6-dimethoxy-benzene-sulfonic acid methyl amide | acetoacetylaminobenzimidazolone | NMP | 68% | reddish yellow |
| 19 | 2-aminoterephthalic acid methyl este-5-(2′,3′-dichloro)-anilide | 2-hydroxy-3-naphthoylamino-4′-acetylaminobenzene | NMP | 89% | limpid red |
| 20 | 3-amino-4,6-dichlorobenzamide | 2-hydroxy-3-naphthoyl-amino-7′-chloro-5′-benzimidazolone | DMF NMP | 88% 92% | bluish red bluish-red |
| 21 | 3-amino-4-methoxybenzoylamino-4′-benzamide | 2-hydroxy-3-naphthoyl-2′,4′-dimethoxy-5′-chloranilide | DMF | 94% | bluish-red |

DMF = dimethyl formamide
NMP = N-methylpyrrolidene

We claim:

1. In a process for the preparation of an azo pigment by diazotizing a diazotizable aromatic amine containing nonsolubilizing substituents, in a water-miscible aprotic organic solvent and coupling the diazonium compound thus obtained with a coupling component selected from the group consisting of 2-hydroxy-3-naphthoylaminoarylides, acetoacetylaminoaryles, pyrazolones, hydroxyquinolines, 2-hydroxy-3-naphthoylamino-benzimidazolones and acetoacetylaminobenzimidazolones, to form an azo pigment, the improvement comprising: diazotizing said amine in an anhydrous dipolar aprotic solvent with from stoichiometric to 20% in excess of stoichiometric amounts of nitrosyl sulfuric acid or nitrosyl chloride at a temperature of from −20° to 40° C.; neutralizing the acid; and thermally aftertreating the pigment formed, without intermediate isolation.

2. A process as defined in claim 1, wherein the diazotizable aromatic amine, contains carbamoyl, carboxylic acid anilide, acylamino or arylamino non-solubilizing substituents.

3. A process as defined in claim 1, wherein coupling is effected to −10° to +50° C.

4. A process as defined in claim 1, wherein the solvent is dimethyl formamide, dimethylacetamide, N-methylpyrrolidone, dimethyl sulfoxide, tetramethylene sulphone, tetramethyl urea or hexamethyl phosphoric acid triamide.

5. A process as defined in claim 1, wherein neutralizing is effected with a tertiary organic base.

6. A process as defined in claim 1, wherein the base is pyridine, dimethyl aniline or triethanol amine.

7. A process as defined in claim 1, wherein the maximum aftertreatment temperature is the boiling temperature of the aprotic solvent.

* * * * *